Patented Jan. 24, 1928.

1,656,984

UNITED STATES PATENT OFFICE.

JESSE A. McCORMICK, OF FRANKLIN PARK, VIRGINIA, AND CHARLES A. CABELL, OF WASHINGTON, DISTRICT OF COLUMBIA, ASSIGNORS TO NATIONAL LIME ASSOCIATION, OF WASHINGTON, DISTRICT OF COLUMBIA, A CORPORATION OF THE DISTRICT OF COLUMBIA.

CEMENTITIOUS COMPOSITION.

No Drawing. Application filed September 5, 1924, Serial No. 736,179. Renewed May 28, 1926.

Our invention relates to the production of a cementitious composition having quick initial setting properties, relatively high early and final strengths and a highly satisfactory degree of workability, the composition being adapted by virtue of these properties for use in the making of mortars, plasters, shaped articles such as blocks and the like.

It has been proposed to treat cementitious material having available lime or similar alkaline earth material for example, hydrated lime or lime putty which may be made from hydrated lime or from quicklime by the addition of water, with aluminous material such as calcium aluminate in order to produce a plastic material or composition. It has further been proposed to treat material of the character referred to with aluminous material such as calcium aluminate having incorporated therewith a compound which will yield the sulfate radical.

Our experiments have shown that mixtures of hydrated lime or lime putty with aluminous material such as calcium aluminate which is on the market under the trade names of "Electric Cement," "Ciment Fondu," and "Lumnite Cement," even in a proportion of calcium aluminate material as high as twenty five per cent, will not produce a satisfactory product for plaster purposes. The use of plasters comprising hydrated lime, and calcium aluminate material having incorporated therein a compound capable of supplying the sulfate radical has not been found satisfactory commercially. Such mixtures were marketed under the trade name of "Alca Lime" during the period 1910-1917 but such use soon discontinued since some of the commercial products failed to develop any quick setting properties while others produced such weak plasters as to entirely prohibit their use.

We have discovered that a satisfactory quick initial setting cementitious product results when a material containing available lime or similar alkaline earth material has incorporated therein, in addition to aluminous material, or a product containing calcium aluminate material, and a substance capable of supplying a sulfate radical or its equivalent, a small amount of carbon dioxide or a substance yielding the carbonate radical. We have found that a cementitious mixture having the proper setting time and strength may be produced by the addition of carbon dioxide to the mixture or to the hydrated lime or similar material whereby there is made available therein the carbonate radical or its equivalent. Preferably we add to the mixture of lime hydrate, aluminous material and a sulfate, relatively slightly soluble carbonates such as magnesium carbonate, precipitated calcium carbonate, ground limestone, iron carbonate, zinc carbonate, etc. Preference is given to the relatively slightly soluble carbonates in order to eliminate any efflorescence in the finished plaster. For example, when soluble carbonates such as sodium, potassium or ammonium carbonate are used, there is the possibility of the formation of soluble salts in the plaster which would tend to induce efflorescence. In place of the carbonates, we may use partially carbonated hydrated lime, which may be prepared by well known methods including air-slaking. We may also use hydrated lime prepared from incompletely burned lime which contains undecomposed or partially decomposed carbonates or "core". However, it is our experience that the use of material of this character is not so satisfactory from the practical standpoint because of the indefiniteness of the composition of the products. We therefore prefer to add a definite and known quantity of the carbonates of the metals, the amount added being regulated depending on the carbonate-content of the hydrated lime used. We have obtained like results by using hydrated lime which has been exposed to an atmosphere containing carbon dioxide gas but owing to the indefiniteness of the composition of such products we prefer the use of definite quantities of added carbonate.

As the aluminous ingredient of our mixture we prefer to use calcium aluminate. The best results are obtained therewith. However, other aluminous material may be used. For example, sodium aluminate, kaolin or clay and others. The use of the latter are not quite so satisfactory as calcium aluminate material, but when such materials are used plastics are obtained which may be practically employed as plasters or mortars.

Among the substances which have been used in our mixture to supply the sulfate radical are the following: ferrous sulfate, ferric sulfate, sodium sulfate, aluminum sulfate, manganese sulfate, magnesium sulfate and potassium sulfate and bisulfate. Any substance, inorganic or organic, capable of supplying the sulfate radical or its equivalent may be used.

Among the carbonates used may be mentioned the following: zinc carbonate, iron carbonate, lead carbonate, strontium carbonate, magnesium carbonate, sodium carbonate, calcium carbonate, barium carbonate, potassium carbonate, ammonium carbonate, magnesite, ground dolomite and ground limestone.

While, in general, we find that we may use, as an addition agent, any material having a sulfate radical or its chemical equivalent or materials which will generate the sulfate radical or its equivalent, we prefer to use aluminum sulfate in the hydrated, or completely or partially anhydrous form.

The term "hydrated lime" is intended to include the various kinds of commercial hydrated lime which may vary considerably in composition. It is intended to include thereunder both calcium and dolomitic hydrated lime. In addition, we intend to cover by this term dry hydrated lime which is a definite article of commerce or lime putty which may be made from hydrated lime or from quick lime.

Our experiments also indicate that the addition of sugar in small quantities to the mixture of lime hydrate, aluminous material, for example calcium aluminate material, sulfate and carbonate, functions not only as a retarder but also has in addition, specific effects in that it develops appreciably more strength in the finished product and improves the workability of the material when used as a plaster or mortar, these effects not being attained when other so-called commercial retarders are used.

Another specific property of our mixture which is possessed by very few quick setting plasters is its ability to be re-tempered or re-gauged after the product has taken on an initial set. Such a property is a very valuable one since material which has been mixed with water and has not been used within a few hours or material which has dropped to the floor during the plastering operation and then recovered may be reworked and used with satisfactory results, or mixed with freshly made batches without any deleterious effect.

In the preferred form of our invention we contemplate the use of a sugar to retard and confer upon our product the desirable properties hereinbefore set forth. However, it is obviously within the broad scope of our invention to use in connection with the mixture of lime hydrate, aluminous material, sulfate and carbonate any of the so-called commercial retarders. The defects of the commercial retarders such as prepared and supplied by manufacturers of hardwall plaster and other such quick setting plaster lies in the large quantities required and the resulting decrease in strength of the products.

The following is an example of a suitable mixture for producing our quick setting cementitious material having the desirable properties hereinbefore set forth: calcium aluminate material (lumnite cement), 4.0%; aluminum sulphate or other sulphates, such as ferrous or ferric, etc., 0.5%; carbonate, such as calcium or magnesium carbonate, either in the form of precipitated or prepared carbonate, or as ground limestone, dolomite, magnesite, air-slaked lime, "core" and so forth, 5.0%; hydrated lime to make 100%.

In the preferred form of our invention the mixture set forth has present a small amount of sugar which of course will vary depending on the chemical and physical properties of the mixture and upon the properties desired in the finished product but we have found that the presence of an amount varying between one tenth to three tenths of a per cent has given very satisfactory results.

A suitable commercial product for use as a prepared plaster may be conveniently prepared as follows: 511.2 lbs. of commercial hydrated lime is dumped into the hopper of a Broughton mixer and over this is distributed 24 lbs. of "lumnite" cement, 3 lbs. of aluminum sulphate, 60 lbs. ground limestone, 1.8 lbs. of confectioner's sugar and from 2.5 to 3.5 lbs. of hair or the equivalent quantity of fibre. This is then dumped into the Broughton mixer where it is mixed thoroughly. The mixture is then conveyed to a Bates valve bagger from which it is bagged in the usual manner.

In order to prepare a commercial product for use as a plaster or mortar or for manufacture of building blocks and the like it may be desirable to add other materials such as hair, fibre, or other such materials, or sawdust, cinders, limestone, sand, clay or other such fillers. With the addition of these materials, the fundamental properties of our mixture remain substantially the same.

From the results of our experiments we are inclined to believe that in our mixture the sulfate, for example, aluminate sulfate, acts as a retarder for the calcium aluminate instead of as an accelerator but, of course, we do not desire to be limited to any statement as to the mechanism of the reaction occurring. The sulphate not only improves the working qualities of our product, but also greatly enhances the setting and strength properties.

The following table gives the set in hours and the strength in pounds per square inch after twenty-four hours of mixtures containing hydrated lime, and with or without all or only some of the addition agents thereby clearly indicating the advantages arising from using our hydrated-lime-calcium aluminate-sulfate-carbonate mixture. Some of the mixtures specify the presence of sugar and in others this addition agent is eliminated.

| Lime No. | % Aluminum sulphate | % Calcium aluminate | % Ground limestone | % Sugar | % Other ingredients | Set Hr. Min. | Ten. Str. 24 hrs. |
|---|---|---|---|---|---|---|---|
| 61ª | 0 | 0 | 0 | 0 | | 10-0 | 7.5 |
| " | .5 | 4 | 5 | .3 | | 3-40 | 17.5 |
| " | .5 | 4 | 5 | 0 | | 8-0 | 8.5 |
| " | .5 | 4 | 0 | .3 | | 4-50 | 10.2 |
| " | .5 | 0 | 5 | .3 | | 6-30 | 6.0 |
| " | 0 | 4 | 5 | .3 | | 6-0 | 14.0 |
| " | .5 | 0 | 0 | 0 | | 10-0 | 6.8 |
| " | .0 | 4 | 0 | 0 | | 10-0 | 6.3 |
| " | 0 | 0 | 5 | 0 | | 10-0 | 5.4 |
| " | 0 | 0 | 0 | .3 | | 10-0 | 5.3 |
| " | .5 | 4 | 0 | .3 | .5 ZnCO₃ | 5-0 | 35.0 |
| " | 0 | 4 | 5 | .3 | .5 FeSO₄ | 3-45 | 13.1 |
| " | 0 | 4 | 5 | .3 | .5 KHSO₄ | 2-30 | 21.3 |
| " | .0 | 4 | 2× | .3 | .5 (Sodium aluminate) | 1-35 | 23.0 |
| 86ª | 0 | 0 | 0. | 0 | | 7-0 | 9.8 |
| " | .5 | 4 | 0 | .3 | | 3-0 | 16.0 |
| " | .5 | 4 | 5 | .3 | | 3-0 | 17.6 |

× Precipitated CaCO₃.
Lime 61ª is a dolomitic lime and 86ª high calcium lime.

The analysis of the materials used in the above table is as follows:

*High calcium hydrate.*

CaO (total) _____ 71.23%
MgO " _____ 0.73%
SiO₂ _____ 1.17%
R₂O₃ _____ 0.61%
Loss on ignition _____ 26.26%

*Dolomitic lime hydrate.*

CaO (total) _____ 47.06%
MgO " _____ 31.34%
SiO₂ _____ 2.30%
R₂O₃ _____ 1.08%
Loss on ignition _____ 17.68%

*Pulverized stone high calcium.*

CaCO₃ _____ 93.0%
MgCO₃ _____ 4.0%
R₂O₃ _____ 1.5%
SiO₂ _____ .5%

*Dolomite.*

CaCO₃ _____ 54.05%
MgO _____ 42.23%
R₂O₃ _____ .63%
SiO₂ _____ 1.82%

*Calcium aluminate.*

CaO _____ 40.25%
Fe₂O₃ _____ 11.74%
Al₂O₃ _____ 47.51%
Acid insol _____ 2.65%

Our experiments indicate that the most satisfactory results are obtained when using as maxima, calcium aluminate material, five per cent; sulfate, one per cent; and as a minimum, carbonate, five tenths of one per cent. The maximum amount of sugar desirable in the mixture appears to be about three tenths of one per cent. We do not desire however, to be limited by the maxima or minima stated, as our invention resides broadly in the mixture containing hydrated lime-calcium aluminate material, sulfate and carbonate and in its preferred form, sugar, and we conceive our invention to be of the broad scope set forth. When using sodium aluminate more sugar than the amount stated is necessary to retard and confer the desirable properties upon our product.

It is within the scope of our invention to form the calcium aluminate in situ by adding to the lime hydrate mixture, materials capable of reacting to produce calcium aluminate. In our experiments we have used various forms of calcium aluminate including those set forth and all of these have been found satisfactory. We prefer to use on account of its ready availability due to domestic production, the product known commercially as "lumnite cement".

Aluminous material such as calcium aluminate on the market under the trade names of "Electric Cement," "Ciment Fondu," "Lumnite Cement" is characterized by a high alumina content appreciably higher than that present in normal commercial Portland cement. In white Portland, the alumina content is appreciably higher than that present in normal Portland cement. In cements on the market under the trade names referred to, the alumina is the main cement component combined with lime as a base.

In the claims the expression "calcium aluminate of the Ciment Fondu type" is intended to include all cements having alumina as the main cement component.

We claim:

1. A cementitious composition comprising a relatively high proportion of hydrated alkaline earth constituent having incorporated therein an aluminous material, a substance capable of supplying a sulfate radical and a material adapted to make available to the mixture a carbonate radical.

2. A cementitious composition comprising a relatively high proportion of available hydrated lime having incorporated therein an aluminous material, a substance capable of supplying a sulfate radical and a material adapted to make available to the mixture a carbonate radical.

3. A cementitious composition comprising a relatively high proportion of available lime having incorporated therein an aluminate material, a substance capable of supplying a sulfate radical and a material adapted to make available to the mixture a carbonate radical.

4. A cementitious composition comprising a relatively high proportion of available lime having incorporated therein calcium aluminate, a substance capable of supplying a sulfate radical and a material adapted to make available to the mixture a carbonate radical.

5. A cementitious composition comprising hydrated lime, an aluminous material, a sulfate and a carbonate.

6. A cementitious composition comprising a relatively high proportion of hydrated lime, having incorporated therein calcium aluminate, a sulfate and a carbonate.

7. A cementitious composition comprising a relatively high proportion of hydrated lime, calcium aluminate, a sulfate and a slightly soluble carbonate.

8. A cementitious composition comprising a relatively high proportion of hydrated lime, having incorporated therein an aluminous material, a substance capable of supplying a sulfate radical, a material adapted to make available to the mixture a carbonate radical and a strength imparting retarder adapted to improve the workability of the composition.

9. A cementitious composition comprising a relatively high proportion of available hydrated lime having incorporated therein an aluminous material, a substance capable of supplying a sulfate radical, a material adapted to make available to the mixture a carbonate radical, and a strength imparting retarder adapted to improve the workability of the composition.

10. A cementitious composition comprising a relatively high proportion of available lime having incorporated therein an aluminate material, a substance capable of supplying a sulfate radical, a material adapted to make available to the mixture a carbonate radical and a strength imparting retarder adapted to improve the workability of the mixture.

11. A cementitious composition comprising a relatively high proportion of available lime having incorporated therein calcium aluminate, a substance capable of supplying a sulfate radical, a material adapted to make available to the mixture a carbonate radical and a strength imparting retarder adapted to improve the workability of the composition.

12. A cementitious composition comprising hydrated lime, calcium aluminate, a substance capable of supplying a sulfate radical, a material adapted to make available to the mixture a carbonate radical and a strength imparting retarder adapted to improve the workability of the composition.

13. A cementitious composition comprising a relatively high proportion of hydrated alkaline earth constituent having incorporated therein an aluminous material, a substance capable of supplying a sulfate radical, a material adapted to make available to the mixture a carbonate radical and a strength imparting retarder consisting of sugar adapted to improve the workability of the composition.

14. A cementitious composition comprising hydrated lime, calcium aluminate, a substance capable of supplying a sulfate radical, a material adapted to make available to the mixture a carbonate radical and sugar.

15. A cementitious composition comprising hydrated lime, calcium aluminate, a sulfate, a small amount of a soluble carbonate and sugar.

16. A cementitious composition comprising hydrated lime, calcium aluminate, aluminum sulfate, a carbonate and sugar.

17. A cementitious composition comprising hydrated lime, calcium aluminate, aluminum sulfate, a slightly soluble carbonate and sugar.

18. A cementitious composition comprising a relatively high proportion of available hydrated lime, and an aluminous material, adapted for use as a plaster and capable of developing a relatively high final strength of and being reworked after the material has taken on an initial set.

19. A quick setting lime hydrate-aluminous composition characterized by the property of being capable of being reworked after it has taken on an initial set.

20. A quick setting lime hydrate-aluminate cementitious composition characterized by the property of being capable of being reworked after it has taken on an initial set.

21. A quick setting mixture comprising lime hydrate, an aluminous material and a material adapted to supply a carbonate radical, and capable of being reworked after it has taken on an initial set.

22. A quick setting lime composition containing a small proportion of sugar characterized by the property of being capable of being reworked after it has taken on an initial set.

23. A cementitious composition comprising about 90 per cent hydrated lime and the remainder, calcium aluminate, a substance capable of supplying a sulfate radical, a material adapted to make available to the mixture a carbonate radical and a strength imparting retarder adapted to improve the workability of the mixture.

24. A lime hydrate plaster of relatively high initial and final strength and characterized by the property of being capable of being reworked after it has taken on an initial set.

25. The process of making a cementitious composition having quick initial setting properties, relatively high, early and final tensile strengths and a highly satisfactory degree of workability comprising mixing in the presence of water a material having a high proportion of available hydrated lime, an aluminous material, a substance capable of supplying a sulfate radical, and a material adapted to make available to the mixture a carbonate radical, and allowing the resulting product to set.

26. The process of making a cementitious composition having quick initial setting properties, relatively high early and final tensile strengths and a highly satisfactory degree of workability comprising mixing in the presence of water a material having a high proportion of available lime, an aluminate material, a substance capable of supplying a sulfate radical, and a material adapted to make available to the mixture a carbonate radical and allowing the resulting product to set.

27. The process of making a cementitious composition having quick initial setting properties, relatively high early and final tensile strengths and a highly satisfactory degree of workability comprising mixing in the presence of water a material having a high proportion of available lime, calcium aluminate, a substance capable of supplying a sulfate radical, and a material adapted to make available to the mixture a carbonate radical and allowing the resulting product to set.

28. The process of making a cementitious composition having quick initial setting properties, relatively high early and final tensile strengths and a highly satisfactory degree of workability comprising mixing in the presence of water hydrated lime, calcium aluminate, a sulfate and a slightly soluble carbonate and allowing the resulting product to set.

29. A cementitious composition comprising a relatively high proportion of alkaline earth constituents having incorporated therein a cementitious aluminous material in which alumina is the main cement component, a substance capable of supplying a sulfate radical and a material adapted to make available to the mixture a carbonate radical.

30. A cementitious composition comprising a relatively high proportion of available lime having incorporated therein a cementitious aluminous material in which alumina is the main cement component, a substance capable of supplying a sulfate radical and a material adapted to make available to the mixture a carbonate radical.

31. A cementitious composition comprising hydrated lime and an aluminous material having alumina as the main cement component, a sulfate and a carbonate.

32. A cementitious composition comprising a relatively high proportion of available lime having incorporated therein calcium aluminate of the Ciment Fondu type, a substance capable of supplying a sulfate radical and a material adapted to make available to the mixture a carbonate radical.

33. The process of making a cementitious composition having quick initial setting properties, relatively high, early and final tensile strengths and a highly satisfactory degree of workability comprising mixing in the presence of water a material having a high proportion of available lime, an aluminous material in which alumina is the main cement component, a substance capable of supplying a sulfate radical and a material adapted to make available to the mixture a carbonate radical and allowing the resulting product to set.

34. The process of making a cementitious composition having quick initial setting properties, relatively high, early and final tensile strengths and a highly satisfactory degree of workability comprising mixing in the presence of water a material having a high proportion of available lime, calcium aluminate of the Ciment Fondu type, a substance capable of supplying a sulfate radical and a material adapted to make available to the mixture a carbonate radical and allowing the resulting product to set.

35. The process of making a cementitious composition having quick initial setting properties, relatively high, early and final tensile strengths and a highly satisfactory degree of workability comprising mixing in the presence of water hydrated lime and cementitious aluminous material in which alumina is the main cement component, a sulfate and a material adapted to make available to the mixture a carbonate radical and allowing the resulting product to set.

36. The process of making a cementitious composition having quick initial setting properties, relatively high, early and final tensile strengths and a highly satisfactory degree of workability comprising mixing in the presence of water hydrated lime, calcium aluminate of the Ciment Fondu type, a sulfate and a carbonate.

37. A cementitious composition comprising a hydrated alkaline earth, a sulphate, an aluminous material, and from 5% to 10% of a carbonate.

38. A cementitious composition comprising hydrated lime, an aluminate, a sulphate, and from 5% to 10% of a carbonate.

39. A potentially reactive plastic mix comprising a hydrated alkaline earth having incorporated therein an aluminous material, a sulphate, and substantially 5% of a carbonate.

40. A cementitious composition comprising a hydrated alkaline earth, an aluminous material, a sulphate, a small amount of sugar, and from 5% to 10% of a carbonate.

41. A cementitious composition comprising hydrated alkaline earth, an aluminous material, a sulphate, and substantially 5% of a carbonate.

42. A cementitious composition comprising a hydrated alkaline earth, a carbonate, a sulphate, and substantially 4% of calcium aluminate.

43. A cementitious composition comprising a hydrated alkaline earth, a carbonate, a sulphate, and from 4 to 5% of an aluminous material.

44. A cementitious composition comprising hydrated lime, a soluble carbonate, a sulphate, and substantially 4% of calcium aluminate.

45. A cementitious composition comprising a hydrated alkaline earth, a carbonate, a sulphate, sugar, and from 4 to 5% of an aluminous material.

46. A potentially reactive mix comprising a hydrated alkaline earth, an aluminous constituent, a carbonate, and from .5% to 1% of a sulphate.

47. A cementitious composition comprising a hydrated lime, an aluminate, a carbonate, and substantially .5% of a sulphate.

48. A cementitious composition comprising, a hydrated alkaline earth, an aluminous constituent, a carbonate, a retarder, and from .5% to 1% of a sulphate.

49. A cementitious composition comprising a hydrated alkaline earth, an aluminous material, a carbonate, sugar, and substantially .5% of a sulphate.

50. A cementitious composition comprising a hydrated alkaline earth, an aluminous material, a sulphate, a carbonate, and from .1% to .3% of sugar.

51. A cementitious composition comprising a hydrated alkaline earth, an aluminous material, a sulphate, a carbonate, and substantially .3% of sugar.

52. A cementitious composition comprising hydrated lime, calcium aluminate, aluminum sulphate, a slightly soluble carbonate, and from .1% to .3% of sugar.

53. A cementitious composition comprising a hydrated alkaline earth, an aluminous material, a sulphate, a carbonate, and more than .1% of sugar.

In testimony whereof they hereunto affix their signatures.

JESSE A. McCORMICK.
CHARLES A. CABELL.